(12) United States Patent
Lewis et al.

(10) Patent No.: US 9,747,483 B2
(45) Date of Patent: Aug. 29, 2017

(54) METHODS FOR SECURING INVISIBLE 2D BARCODES AND PRINTED IMAGES

(71) Applicant: TROY GROUP, INC., Costa Mesa, CA (US)

(72) Inventors: Brian Lewis, Wheeling, WV (US); Xiaorong Cai, Mount Pleasant, SC (US); Michael R. Riley, Steubenville, OH (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 14/976,929

(22) Filed: Dec. 21, 2015

(65) Prior Publication Data
US 2016/0247008 A1 Aug. 25, 2016

Related U.S. Application Data

(60) Provisional application No. 62/118,206, filed on Feb. 19, 2015, provisional application No. 62/132,297, filed on Mar. 12, 2015.

(51) Int. Cl.
*G06K 7/10* (2006.01)
*G06K 19/06* (2006.01)
*G06K 7/14* (2006.01)

(52) U.S. Cl.
CPC ....... *G06K 7/10732* (2013.01); *G06K 7/1417* (2013.01); *G06K 7/1447* (2013.01); *G06K 19/0614* (2013.01)

(58) Field of Classification Search
CPC ... G06K 7/12; G06K 7/14; G06K 2019/06225

USPC .................. 235/468, 469, 462.04
See application file for complete search history.

(56) References Cited

U.S. PATENT DOCUMENTS

| 5,576,528 A | 11/1996 | Chew et al. |
| 6,098,610 A * | 8/2000 | Egglhuber ......... B23D 57/0053 125/16.01 |
| 6,373,965 B1 * | 4/2002 | Liang .................... B41M 3/144 382/112 |
| 7,422,158 B2 | 9/2008 | Auslander et al. |
| 2005/0087605 A1 * | 4/2005 | Auslander .............. G06K 1/123 235/491 |

(Continued)

FOREIGN PATENT DOCUMENTS

WO   WO 2005/020590   3/2005

OTHER PUBLICATIONS

J.M. Meruga et al., "Security Printing of Convert Quick Response Codes using Upconverting Nanoparticle Inks", Nanotechnology 23, 2012, 10 pages.

(Continued)

*Primary Examiner* — Daniel St. Cyr

(57) ABSTRACT

A secure document includes a fluorescent barcode and a fluorescent filler printed onto a substrate. The fluorescent barcode is printed using a first fluorescent ink of a first color and the fluorescent filler is printed using a second fluorescent ink of a second color that is different than the first color. In order to read the fluorescent barcode, the secure document must be illuminated with ultraviolet and/or infrared light. Then, a color filter must be used to filter the fluorescent filler out, leaving the fluorescent barcode visible.

6 Claims, 14 Drawing Sheets

(56) References Cited

U.S. PATENT DOCUMENTS

| | | |
|---|---|---|
| 2005/0088500 A1* | 4/2005 | Auslander ................ B41M 3/14 347/100 |
| 2005/0269416 A1 | 12/2005 | Sussmeier et al. |
| 2006/0280331 A1 | 12/2006 | Chosson et al. |
| 2007/0119949 A1* | 5/2007 | Hattersley ................ G06K 7/10 235/472.01 |
| 2007/0119950 A1* | 5/2007 | Auslander ........ G06K 19/06018 235/486 |
| 2008/0009412 A1 | 1/2008 | Funada et al. |
| 2013/0207375 A1 | 8/2013 | Eichenberger et al. |
| 2014/0261031 A1 | 9/2014 | Kellar et al. |

OTHER PUBLICATIONS

International Search Report and Written Opinion of the International Searching Authority, U.S. Search Authority, PCT/US2016/016538, Dated Apr. 15, 2016, 16 pages.

* cited by examiner

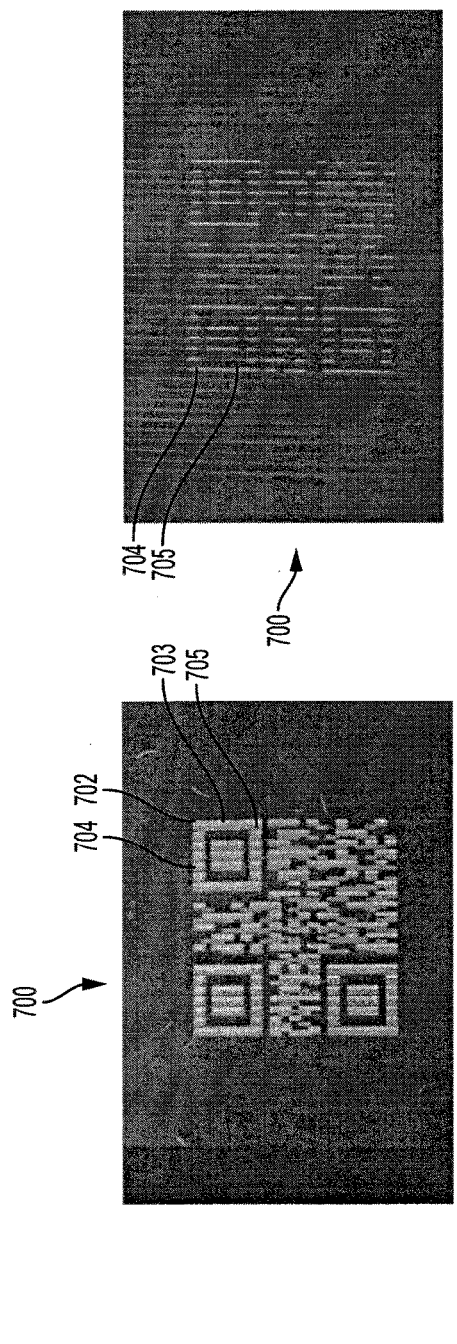
FIG. 7A
FIG. 7B
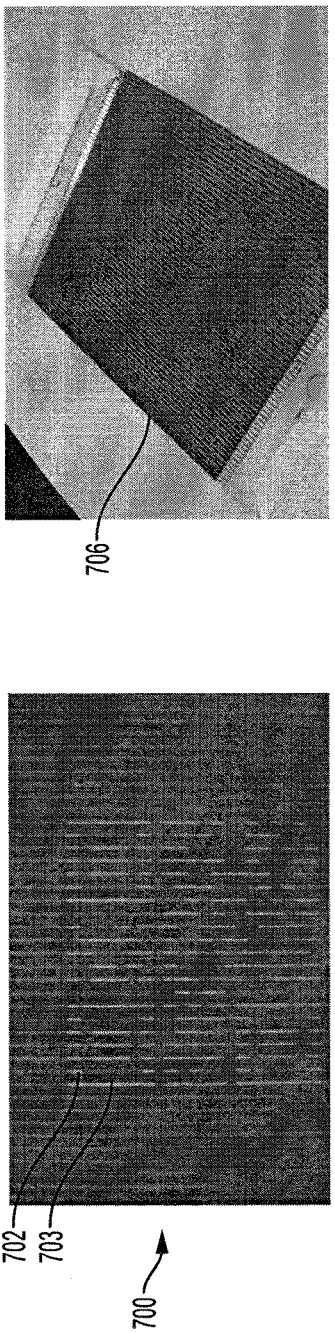
FIG. 7C
FIG. 7D

METHODS FOR SECURING INVISIBLE 2D BARCODES AND PRINTED IMAGES

CROSS REFERENCE TO RELATED APPLICATIONS

This application claims the benefit of U.S. provisional patent application Ser. No. 62/118,206 filed on Feb. 19, 2015, titled "Methods for Securing Invisible 2D Barcodes and Printed Images" and U.S. provisional patent application Ser. No. 62/132,297 filed on Mar. 12, 2015, titled "Methods for Securing Covert Barcodes and Printed Images," both of which are incorporated in this application as if fully set forth herein.

BACKGROUND OF THE INVENTION

1. Field of the Invention

The present invention generally relates to documents having secure barcodes and systems and methods for producing these documents. In particular, the present invention relates to documents having a fluorescent barcode that is further protected from forgery by security features, in addition to the fluorescence.

2. Description of Related Art

Barcodes have been used for labeling and identifying objects for many years. Until recently, barcodes were one dimensional, having only vertical lines of variable widths and spacing therebetween. For a long time, these barcodes could only be read by barcode readers and were thus fairly secure from unauthorized reading and forgeries. As optical and computing technology became more advanced, more devices (such as smartphones and printer/scanner systems) became capable of reading and interpreting barcodes.

Around the same time, two dimensional barcodes began appearing. Two dimensional barcodes can contain a greater amount of data than one dimensional barcodes, due to the greater number of representations possible in two dimensions. Two dimensional barcodes are now used for many purposes, in addition to the original use of labeling and identifying objects, such as advertising and document security.

One example of such document security includes printing a barcode on a document using fluorescent ink or toner (fluorescent ink). The fluorescent ink fluoresces when illuminated by light of a particular wavelength, such as ultraviolet or infrared, and is colorless when illuminated by normal lighting. Because the ink is colorless in daylight, for example, a counterfeiter may not realize that a fluorescent barcode exists on an original document. A forgery will, thus, be easy to identify, due to the lack of the fluorescence in the barcode. Ultraviolet barcodes may also include information that is not displayed in visible ink on the document. For example, character strings, website addresses, etc. can be represented by a barcode. Thus, even if the document is stolen, the information represented by the barcode may be secure.

As fluorescent barcodes have increased in popularity, so has the knowledge of their existence. Due to the increased awareness that documents may include fluorescent barcodes, the security that these barcodes once provided is diminishing. In particular, any data represented by the fluorescent barcode is now relatively simple to obtain by illuminating the document with an ultraviolet or infrared light and scanning the fluorescing barcode.

Furthermore, ultraviolet inks are becoming more popular and can be purchased by the general population. Printing with these ultraviolet inks can be done using many printers by simply replacing a traditional ink cartridge with a fluorescent ink cartridge. Thus, not only is the data represented by fluorescent barcodes less secure, but counterfeiters can now more easily produce counterfeits.

For the foregoing reasons, secure fluorescent barcodes and methods and systems for making the fluorescent barcodes more secure are desirable.

SUMMARY OF THE INVENTION

The present invention provides secure documents having fluorescent barcodes and/or fluorescent security features which increase the difficulty of unauthorized reading and duplication of the secure document. A first secure document includes a fluorescent barcode positioned within a specific area of the document. A fluorescent filler that has a different color than the fluorescent barcode is at least partially positioned within the specific area of the document. The fluorescent filler interferes with finding and scanning the fluorescent barcode. In order to find and scan the fluorescent barcode, a filter, such as a color filter or a line filter, must be used to filter out the fluorescent filler.

As an additional security measure, the fluorescent filler may resemble another barcode that has a different pattern than the fluorescent barcode. To implement another security measure, the fluorescent barcode may only be a portion of a full barcode. The fluorescent filler would be another portion of the full barcode, such that the fluorescent barcode may be positioned adjacent to the fluorescent filler to form the full barcode for scanning. Another security measure includes using optical brighteners of a document as the fluorescent filler. The optical brightener washes out the fluorescent barcode when the secure document is illuminated by ultraviolet and/or fluorescent light. For additional security, an image may appear when the fluorescent barcode and/or the fluorescent filler are viewed out of focus such that the fluorescent barcode and/or the fluorescent filler operate as an autostereogram.

Another secure document has a fluorescent barcode that fluoresces when illuminated by light having a first wavelength and a fluorescent filler that fluoresces when illuminated by light having a second wavelength that is different than the first wavelength and a more common wavelength. The fluorescent filler may resemble a second barcode. The fluorescent barcode can only be read by illuminating with a light having the first wavelength.

Yet another secure document includes an image printed using two visible inks and two fluorescent inks. The visible inks may create a pattern on a substrate and the fluorescent inks may create a barcode. To increase the difficulty in finding the barcode, the fluorescent inks may have similar colors as the visible inks and may be aligned with the visible ink of the corresponding color.

Another secure document includes a fluorescent security feature having at least two colors positioned adjacent to each other. The security feature will form an image with the two colors changing at particular locations such that the security feature resembles a foil hologram. The security feature may instead form a pattern or image that provides a stereoscopic three dimensional effect when viewed using anaglyph glasses.

BRIEF DESCRIPTION OF THE DRAWINGS

A more complete understanding of the present invention will become freely apparent by referring to the detailed description of the attached drawings which illustrate a preferred embodiment and wherein:

FIG. 7A is a photograph of a secure document having alternating columns of a fluorescent barcode and a fluorescent filler as viewed under ultraviolet and/or fluorescent light;

FIG. 7B is a photograph of the secure document of FIG. 7A after filtering of the fluorescent barcode;

FIG. 7C is a photograph of the secure document of FIG. 7B after filtering of the fluorescent filler;

FIG. 7D is a photograph of a line filter used for filtering the secure document of FIG. 7A;

DETAILED DESCRIPTION OF THE PREFERRED EMBODIMENTS

Figure 1:
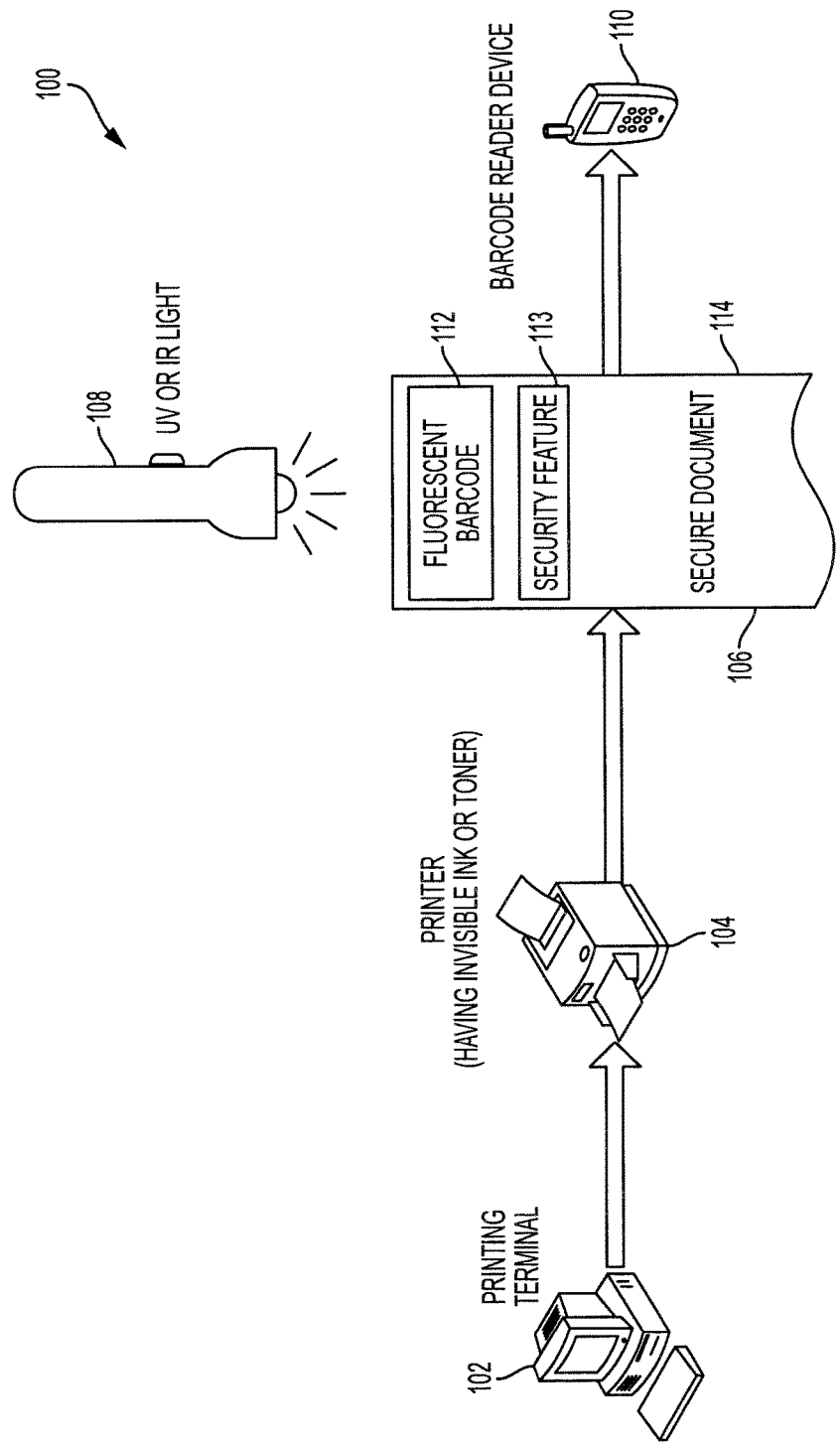
FIG. 1 is a block diagram showing features of a system for creating and reading secured ultraviolet barcodes, according to an embodiment of the present invention.

Referring to FIG. 1, a system 100 for creating and/or reading secured documents having a fluorescent barcode protected by a fluorescent security feature includes a printing terminal 102, a printer 104, a barcode reader device 110 and a light 108. The light 108 may generate light having wavelengths outside of the visible spectrum, such as ultraviolet light or infrared light.

The printing terminal 102 can be used to generate a print object of a secure document having a fluorescent barcode and a security feature. The print object is a set of data that informs the printer 104 of how to print the secured document. The print object may be generated, for example, by software executed by a processor of the printing terminal 102. After the print object has been generated, the printing terminal 102 may transmit the print object to the printer 104 for printing.

The printer 104 may be an inkjet printer, a laser printer or any other type of printer capable of transferring ink or toner to a document, or substrate. The printer 104 may include one or more ink or toner cartridges. At least one of the cartridges includes a fluorescent ink or toner (i.e., inks or toners that fluoresce when illuminated by light having a particular wavelength, such as ultraviolet light or infrared light). In some embodiments, one or more of the ink or toner cartridges of the printer 104 may include visible ink or toner.

Various examples of fluorescent inks and toners exist in the art. For example, an ultraviolet toner is disclosed in Heilman et al. (U.S. patent application Ser. No. 14/857,389, titled "COLORLESS ULTRAVIOLET SECURITY TONER") and an infrared ink is disclosed by Auslander (U.S. Pat. No. 5,684,069, titled "COMPOSITION FOR INVISIBLE INK RESPONSIVE TO INFRARED LIGHT"). Where referenced throughout this disclosure and claims, an ink may refer to either an ink or a toner.

In response to receiving the print object from the printing terminal 102, the printer 104 may generate a secure document 106 by printing the fluorescent barcode 112 and the security feature 113 onto a substrate 114. The security feature 113 increases the difficulty of reading and/or reproducing the fluorescent barcode 112.

At least a part of the secure document 106 may be printed using fluorescent ink and, thus, is only be visible under the light 108. Thus, in order to read or scan the barcode 112, a user may first turn on the ultraviolet and/or infrared light 108 to illuminate the part of the secure document 106. While the secure document 106 is illuminated by the light 108, a user may capture an image of the fluorescing part of the secure document 106. Because the secure document 106 includes the fluorescent barcode 112 and the security feature 113, the barcode 112 will require extraction from the secure document 106 in order to be read.

The barcode reader device 110 is capable of capturing an image of the secure document 106 and extracting the barcode 112 therefrom. As will be described below, the secure document 106 may have any of a number of additional security features 113. Thus, the barcode reader device 110 may be designed to extract barcodes from any of the additional security features. After extraction of the barcode 112, the barcode reader device 110 may be capable of analyzing the barcode 112.

Figure 2:
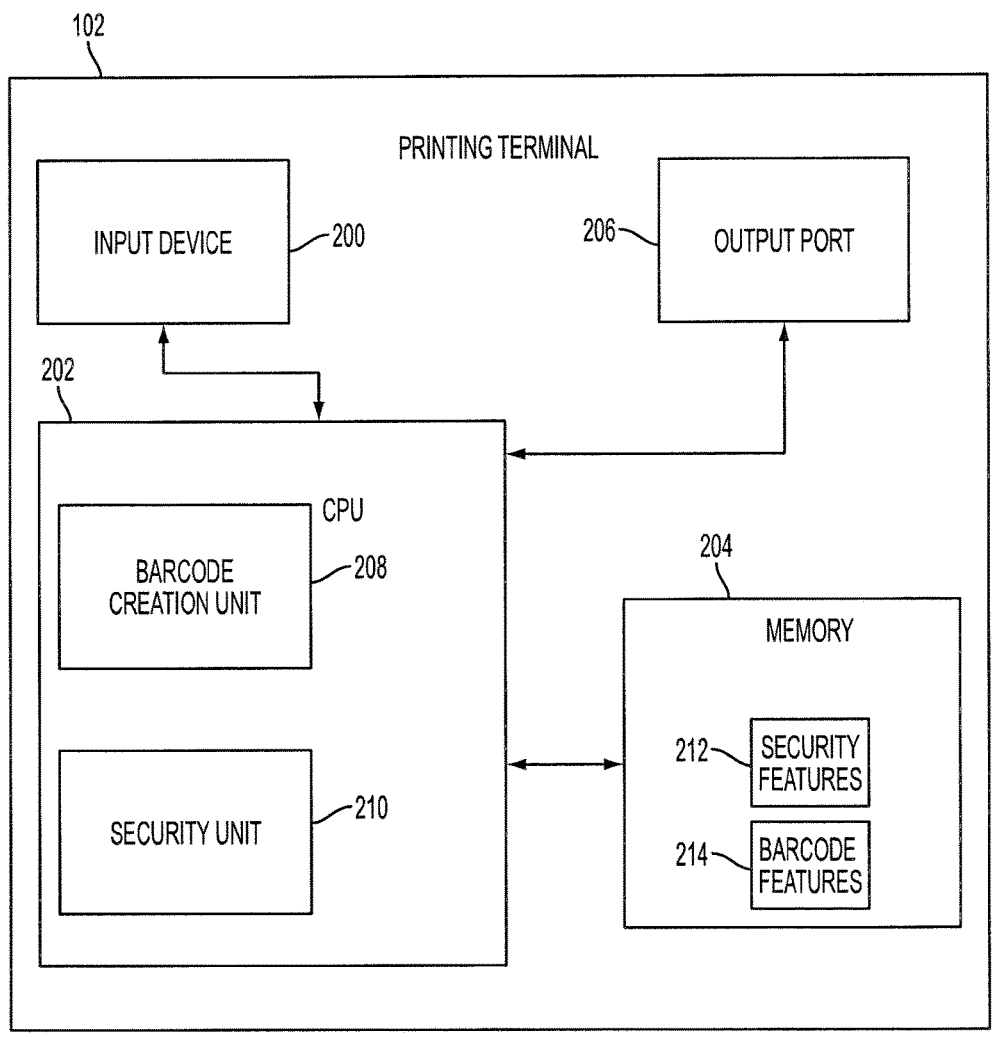
FIG. 2 is a block diagram of a printing terminal used to create a print object of a secure document having a fluorescent barcode and a security feature, according to an embodiment of the present invention.

Turning to FIG. 2, the printing terminal 102 includes an input device 200, a processor 202, a memory 204 and an output port or device 206. The input device 200 may include any input device capable of receiving input from a user and/or from another device. For example, the input device 200 may include a keyboard, a mouse, a scanner, a camera, a USB port or the like.

The processor 202 may include one or more processors such as, for example, a general purpose processor, a digital signal processor (DSP), an application specification integrated circuit (ASIC), a field programmable gate array (FPGA) or other programmable logic device, discreet gate or transistor logic, discreet hardware components, or any combination thereof. In some embodiments, the processor 202 may also include one or more tangible, non-transitory memories that may be separate from the memory 204.

The processor 202 may include various units for creating secure documents. For example, the processor 202 may include a barcode creation unit 208. The barcode creation unit 208 may generate barcodes based on user input and/or based on logic (such as logic for generating purely random barcodes). In some embodiments, a user may wish for the barcode to represent certain information, such as a number, a character string, a website address or the like. The user may provide the desired information to the processor 202 via the input device 200. The barcode creation unit 208 may then create a barcode that includes a representation of the requested information. In some embodiments, a user may provide an already-created barcode to the printing terminal 102 via the input device 200 such that the barcode creation unit 208 need not generate a barcode.

The processor 202 may also include a security unit 210. The security unit 210 may generate one or more security features and/or apply security features to the fluorescent barcode. These added security features further secure the fluorescent barcode, such that they can be printed together to create a secure document. Examples of such security features are described below with reference to FIGS. 6A through 13B.

The memory 204 may be a non-transitory memory capable of storing data. The memory 204 may or may not be separate from the memory of the processor 202. In that regard, the memory 204 may store instructions to be executed by the processor 202 along with other data. For example, the memory 204 may include machine-readable instructions for generating and applying security features 212, which may be executed by the processor 202. The processor 202 may determine which security feature or features to apply to the barcode based on user input. The processor 202 may then retrieve data associated with the security features from the memory 204. The memory 204 may also store instructions for generating barcode features 214 that the processor 202 can access when generating secure documents.

The output port 206 may include any type of output port capable of transmitting data, such as a print object, to another device, such as a printer. The print object may include the fluorescent barcode and the security feature. For example, the output port 206 may include any USB port, WiFi port, Bluetooth port or the like.

Figure 3:
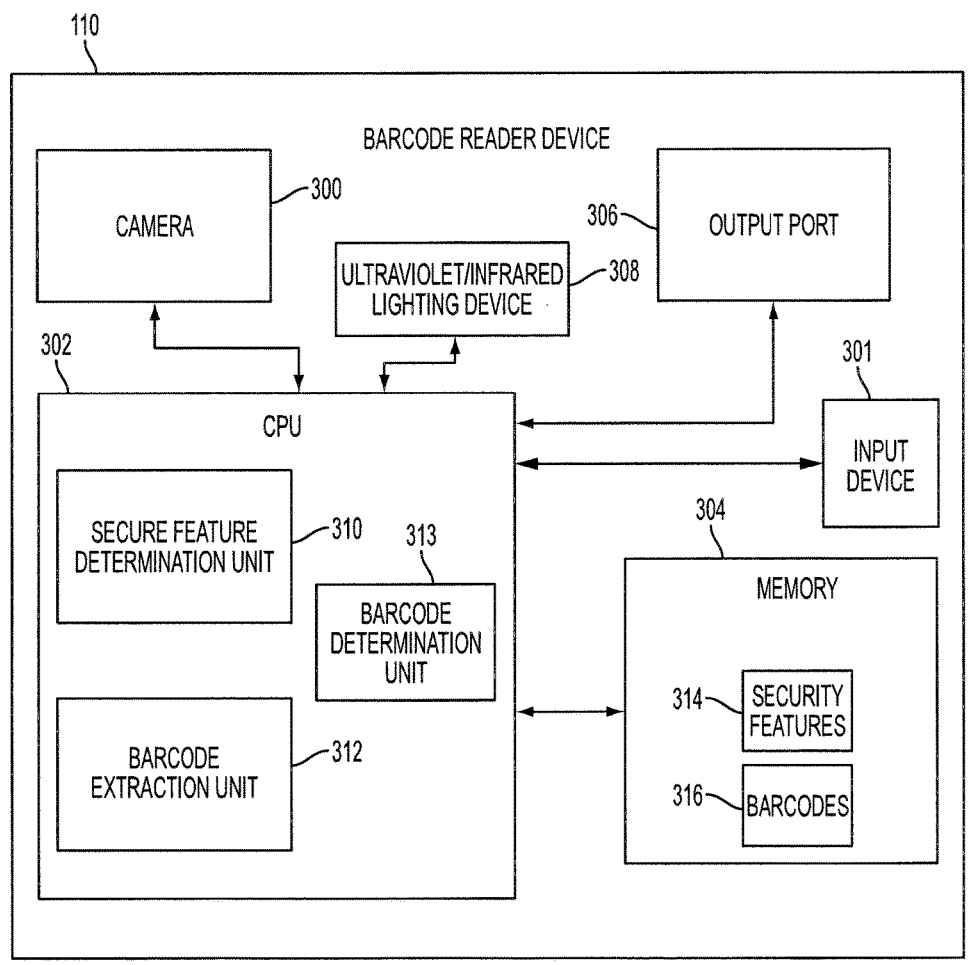
FIG. 3 is a block diagram of a barcode reader device for reading and/or scanning a secure document having a fluorescent barcode and a security feature, according to an embodiment of the present invention.

Turning to FIG. 3, the barcode reader device 110 may include a camera or other image detecting device (camera) 300, a processor 302, a memory 304, an output port or device 306 and an input device 301. The barcode reader device 110 may optionally include an ultraviolet and/or infrared lighting device 308.

The camera 300 may include any device or sensor capable of detecting image data. For example, the camera 300 may detect at least a portion of the secure document when illuminated by the ultraviolet/infrared lighting device 308.

The input device 301 may include any input device capable of receiving user input. For example, the input device 301 may include a mouse, a keyboard, a button or the like.

The processor 302 may include one or more processors and be capable of implementing logic. The processor 302 can be a general purpose processor, a digital signal processor (DSP), an application specific integrated circuit (ASIC), a field programmable gate array (FPGA) or other programmable logic device, discreet gate or transistor logic, discreet hardware components, or any combination thereof.

The processor 302 may include a security feature determination unit 310, a barcode extraction unit 312 and a barcode determination unit 313. The security feature determination unit 310 may be capable of determining which security feature or features have been applied to a fluorescent barcode. For example, the security feature determination unit 310 may receive input from the input device 301 indicating the type of security feature used. As another example, the security feature determination unit 310 may be capable of determining which security feature is applied based on the detected image data from the camera 300.

The barcode extraction unit 312 may be capable of extracting the barcode from the secure document. For example, after determining which security feature was applied to the barcode, the barcode extraction unit 312 may apply a filter or other logic to extract the barcode from the secure document.

The barcode determination unit 313 may be capable of determining data corresponding to the detected barcode after the barcode has been extracted from the secure document. For example, the barcode determination unit 313 may determine whether the barcode represents a character string, a website address or other representative information and may determine the specific string, website address or other information.

The memory 304 may be a non-transitory memory capable of storing data. The memory 304 may or may not be separate from the memory of the processor 302. In that regard, the memory 304 may store instructions to be executed by the processor 302. For example, the memory 304 may include data corresponding to security features 314 that can be used by the security feature determination unit 310 for determining which security feature is applied to the barcode and for extracting the barcode. The memory 304 may also include barcode data 316 usable by the barcode determination unit 313 for determining data represented by the extracted barcode.

The output port or device 306 may include any output port or output device capable of outputting data, such as data represented by the barcode. For example, the output port or device 306 may include a display for displaying the data, an Ethernet port for outputting the data or the like.

The ultraviolet/infrared lighting device 308 may be controllable by a user and/or by the processor 302 for generating infrared and/or ultraviolet light. In some embodiments, the ultraviolet/infrared lighting device 308 may be capable of generating light at various wavelengths based on instructions from a user or the processor 302. For example, the processor 302 may determine that the secure document includes a first ink that fluoresces when exposed to light having a first wavelength and a second ink that fluoresces when exposed to light having a second wavelength. The processor 302 may then control the ultraviolet/infrared lighting device 308 to output light at a wavelength corresponding to at least one of the first ink or the second ink.

Figure 4:
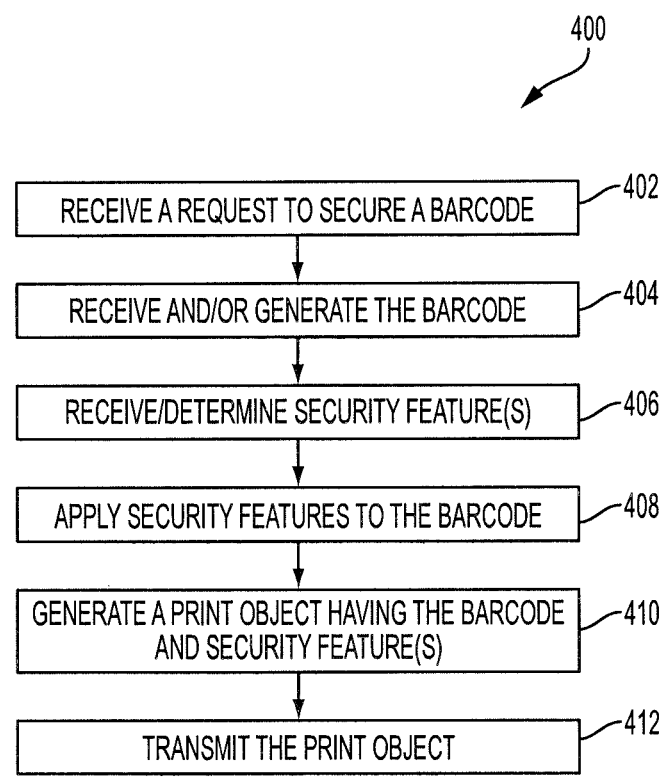
FIG. 4 is a flowchart illustrating a method for creating a secure document having a fluorescent barcode and a security feature, according to an embodiment of the present invention.

Turning now to FIG. 4, a method 400 for generating a secure document by a printing terminal, such as the printing terminal 102 of FIG. 1, is shown. The steps of the method 400 can be performed by components of the printing terminal, such as the input device 200, the processor 202, the memory 204 and/or the output port 206 of FIG. 2.

At block 402, the processor receives a request to secure a barcode. This request may be received from an input device such as a mouse, a keyboard or the like.

In block 404, the processor may receive a barcode, data to be represented by a barcode or an instruction to generate a barcode based on predetermined logic. For example, the processor may receive a website address to be represented by the barcode. This data may be received from the input device.

In block 406, the processor receives and/or determines one or more security features to be applied to the barcode. For example, the processor may be designed to automatically apply a predetermined security feature to any barcode. In some embodiments, a user may have the ability to select a security feature to be applied from a plurality of security features. In some embodiments, the printing terminal may also apply additional information to the print object indicating the type of security feature used. For example, a symbol, such as a square printed in a corner of the document, may be added to indicate that a first security feature is applied, while a second symbol, such as a triangle printed in the corner of the document, may be added to indicate that a second security feature is applied. The additional information may be printed using visible ink or fluorescent ink.

In block 408, the processor applies the security features as determined in block 406.

In block 410, the processor generates a print object of the secure document including the barcode and the security feature or features.

In block 412, the output port outputs the print object to the printer for printing onto a substrate.

Figure 5:
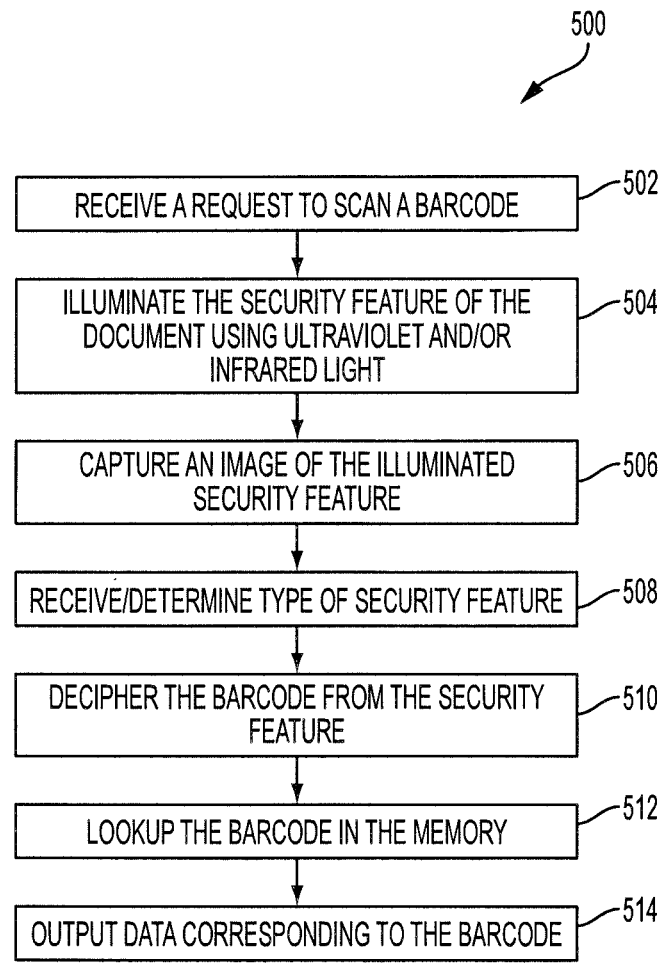
FIG. 5 is a flowchart illustrating a method for reading and/or scanning a secure document having a fluorescent barcode and a security feature, according to an embodiment of the present invention.

Turning to FIG. 5, a method 500 for determining data represented by a barcode of a secure document is shown. The method 500 can be performed, for example, by components of a barcode reader device such as the barcode reader device 110 of FIG. 1, including the camera 300, the input device 301, the processor 302, the memory 304, the output port 306 and/or the ultraviolet/infrared lighting device 308 shown in FIG. 3.

The method 500 may begin at block 502 where the input device receives a request to scan a barcode from a user or another device (such as a remote device).

In block 504, if the barcode reader device includes an ultraviolet and/or infrared lighting device, a user or the processor may activate the lighting device to illuminate the secure document. If the barcode reader device does not include such a light, a user may activate another ultraviolet and/or infrared lighting device to illuminate the secure document. By illuminating the secure document with the ultraviolet and/or infrared light, at least some of the ink printed on the secure document will fluoresce.

In block 506, the camera or other image detection device captures an image of the fluorescing portion of the secure document while illuminated by the ultraviolet/infrared light.

In block 508, the processor may receives an indication of and/or determines the type of security feature or features used in the secure document. This information may be received from a user via the input device or may be determined by the processor based on data detected in the captured image.

In block 510, the processor extracts the barcode. For example, the processor may apply a filter to the captured image to filter out certain colors or other aspects of the security feature. As will be discussed below, other filters and/or other manners for extracting barcodes have been contemplated by the inventors.

In block 512, the processor may determine what data is represented by the barcode. In some embodiments, the barcode may be compared to barcodes or other data stored in the memory to determine a match and data corresponding to the match. In some embodiments, the processor may be capable of analyzing the features of the barcode to determine the represented data. In some embodiments, the output port or device may transmit the barcode to a remote device to be analyzed by the remote device.

In block 514, the output port or device outputs the barcode and/or the data represented by the barcode.

Figure 6A:
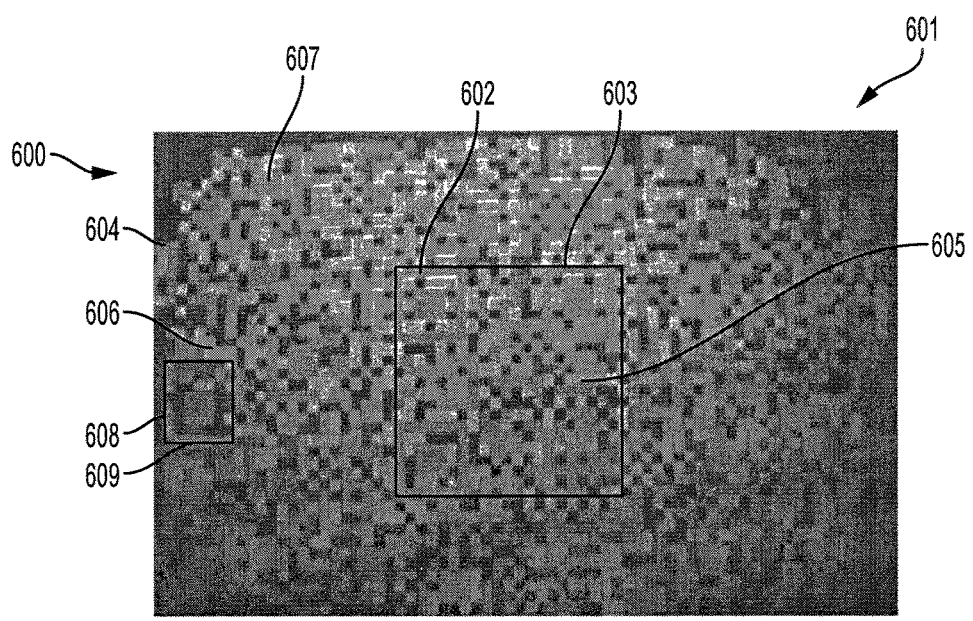
FIG. 6A is a photograph of a secure document having a fluorescent barcode and a fluorescent filler as viewed under ultraviolet and/or fluorescent light.

Turning now to FIG. 6A, a secure document 600 may include a first fluorescent ink 604 and a second fluorescent ink 606. The first ink 604 and the second ink 606 may appear colorless under normal lighting and may appear as different colors when illuminated by ultraviolet and/or fluorescent light. For example, the first ink 604 may appear red while the second ink 606 appears blue when illuminated by ultraviolet light.

The secure document 600 includes a fluorescent barcode 602 printed using the first ink 604 and a fluorescent interference pattern 605 printed using the second ink 606. The fluorescent interference pattern 605 is a security feature for increasing the difficulty of reading and/or reproducing the barcode 602. When the secure document 600 is viewed under ultraviolet light, the barcode 602 is imperceptible due to the addition of the interference pattern 605. Thus, a person who is unauthorized to read the barcode 602 may be prevented from doing so by the inability to distinguish the barcode 602 from the interference pattern 605.

The secure document 600 may include a substrate 601. The fluorescent barcode 602 and the fluorescent interference pattern 605 may be positioned within a specific area 603 of the substrate 601 such that the interference pattern 605 directly interferes with the barcode 602.

As an added security measure, the secure document 600 also includes a second interference pattern 607 printed outside of the specific area 603. The second interference pattern 607 includes the first ink 604 and the second ink 606. The positioning of the second interference pattern outside of the specific area 603 increases the difficulty of discerning the barcode 602, as it masks the location of the barcode 602.

In order to view the barcode 602, a color filter may be used to filter out the second fluorescent ink 606. This filtering may be performed by a physical color filter or may be performed by a logical filter of a barcode reader device such as the barcode reader device 110 of FIG. 1. For example, the barcode extraction unit 312 of FIG. 3 may be used to filter the second fluorescent ink 606 from the secure document.

Figure 6B:
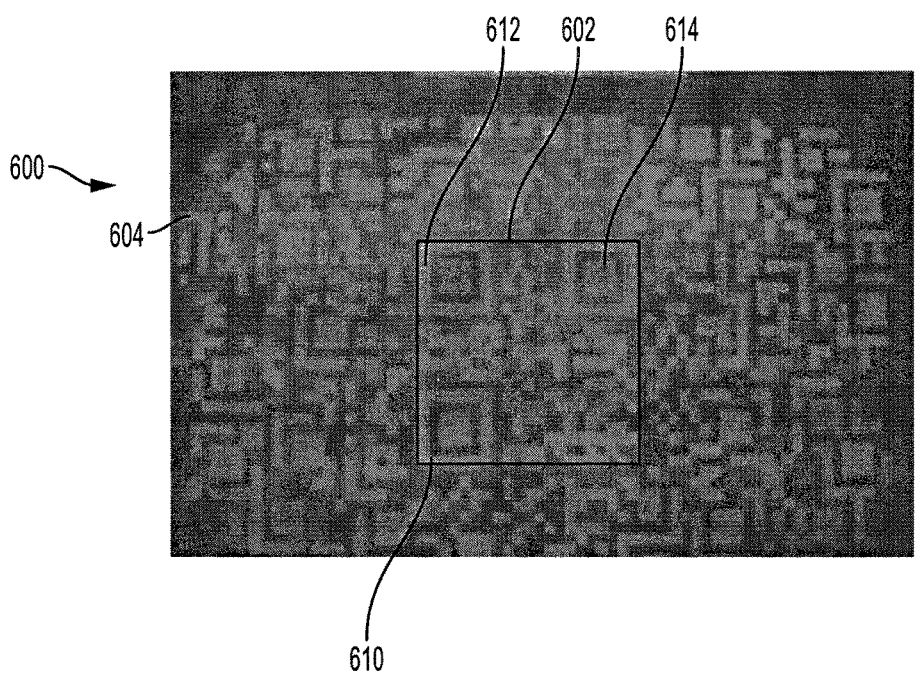
FIG. 6B is a photograph of the secure document of FIG. 6A after filtering of the fluorescent filler.

After filtering the second fluorescent ink 606 from the secure document 600, only the first fluorescent ink 604 is visible, as shown in FIG. 6B. The location of a first feature 610, a second feature 612 and a third feature 614 of the barcode 602 indicates the boundary of the barcode 602.

Referring briefly to FIGS. 3 and 6A, the processor 302 may be capable of determining that the barcode 602 is secured by the interference pattern. For example, the camera 300 may detect that the secure document 600 includes a predetermined pattern 608 within a second specific area 609 of the secure document 600. The security feature determination unit 310 may be able to analyze the predetermined pattern 608 to determine that the security feature is the interference pattern 605. Thus, the processor 302 can decipher the barcode 602 without additional user input.

Turning to FIG. 7A, another secure document 700 may include a first fluorescent ink 702 and a second fluorescent ink 704. The first ink 702 and the second ink 704 may appear colorless under normal lighting and may appear as different colors when illuminated by ultraviolet and/or infrared light. For example, the first ink 702 may appear red while the second ink 704 appears blue.

The secure document 700 is generated by placing patterned columns of the first ink 702 adjacent to patterned columns the second ink 704 in an alternating fashion. The first ink 702 may form a barcode 703 and the second ink 704 may form a filler 705, which may resemble a second barcode. When viewing the secure document 700, the combined barcode 703 and filler 705 may resemble a third barcode that is different than the barcode 703 and different than the filler 705. Because the combination of the barcode 703 and filler 705 resemble a third barcode, any data obtained by reading the third barcode will be different than data represented by the barcode 703. Thus, an unauthorized user will have difficulty in finding and accurately capturing the barcode 703.

Referring now to FIGS. 7A and 7D, a physical line filter 706 may be used to extract the barcode 703 from the secure document 700. In some embodiments, a logical line filter, such as one implemented using software by a barcode reader device, can be used to extract the barcode 703.

As shown in FIGS. 7B and 7C, the filler 705 and the barcode 703 are not identical. In that regard, the filler 705 and barcode 703 have different patterns and, thus, represent different information. Thus, in addition to learning that filtering is required to properly read the barcode 703, an unauthorized user must also learn which of the barcode 703 or the filler 705 is the correct barcode.

As an additional security feature, the filler 705 may be printed using the same ink as the barcode 703. In that regard, the barcode reader device may include logic that allows it to determine the width of each column of the barcode 703 and of the filler 705 and a location at which at least one of the barcode 703 or the filler 705 begins. In various embodiments, the barcode 703 and the filler 705 may be printed using horizontal lines instead of vertical lines, may be printed using alternating patterns vertically and horizontally such that geometrical filters other than line filters are required to read the barcode 703.

Figure 8A:
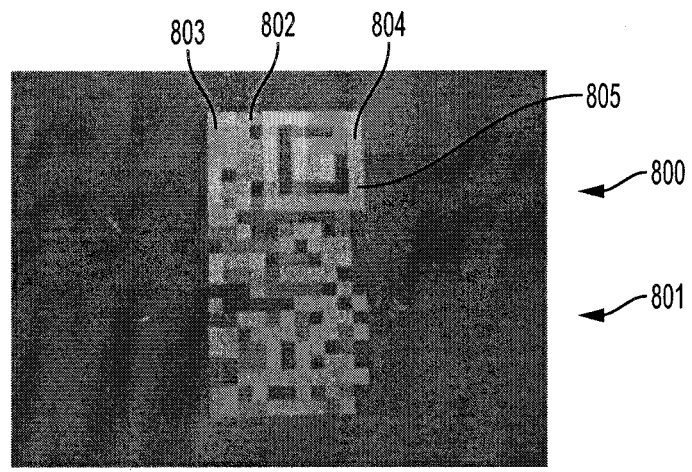
FIG. 8A is a photograph of a secure document having a first portion of a fluorescent barcode and a second portion of the fluorescent barcode superimposed and viewed under ultraviolet and/or infrared light.
Figure 8B:
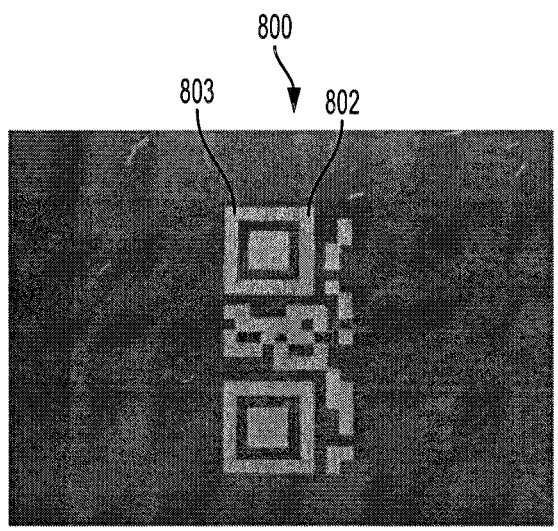
FIG. 8B is a photograph of the first portion of the fluorescent barcode of FIG. 8A after filtering of the second portion.

Turning to FIG. 8A, another secure document 800 may include a first fluorescent ink 802 and a second fluorescent ink 804. The first ink 802 and the second ink 804 may appear colorless under normal lighting and may appear as different colors when illuminated by ultraviolet or infrared light. For example, the first ink 802 may appear red while the second ink 804 appears blue.

The first ink 802 may represent a first portion 803 of a barcode 801 and the second ink 804 may represent a second portion 805 of the barcode 801. Because the first portion 803 and the second portion 805 are superimposed, a traditional barcode scanner will not be able to properly scan the barcode 801. Although the first portion 803 and the second portion 805 are superimposed, the first portion 803 may be positioned with any relation to the second portion 805 without departing from the scope of the disclosure. For example, the first portion 803 may be positioned perpendicular relative to the second portion 805. Furthermore and in some embodiments, the first portion 803 may be separated from the second portion 805 by a distance. In any of these embodiments, the first portion 803 and the second portion 805 may be positioned such that a conventional barcode scanner cannot scan the barcode 801.

Figure 8C:
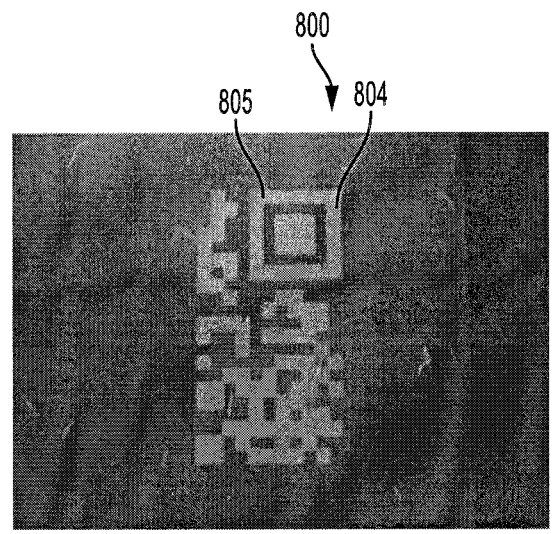
FIG. 8C is a photograph of the second portion of the fluorescent barcode of FIG. 8A after filtering of the first portion.

In order to separate the first portion 803 from the second portion 805, a first color filter may be applied to the secure document 800. For example and referring to FIGS. 8A and 8B, the first color filter may filter out the second ink 804, leaving only the first portion 803 to be detected or captured. Referring now to FIGS. 8A and 8C, a second color filter may be used to filter out the first ink 802, leaving only the second ink 804 to be detected or captured. An image of each of the portions 803, 805 may be captured separately.

Figure 8D:
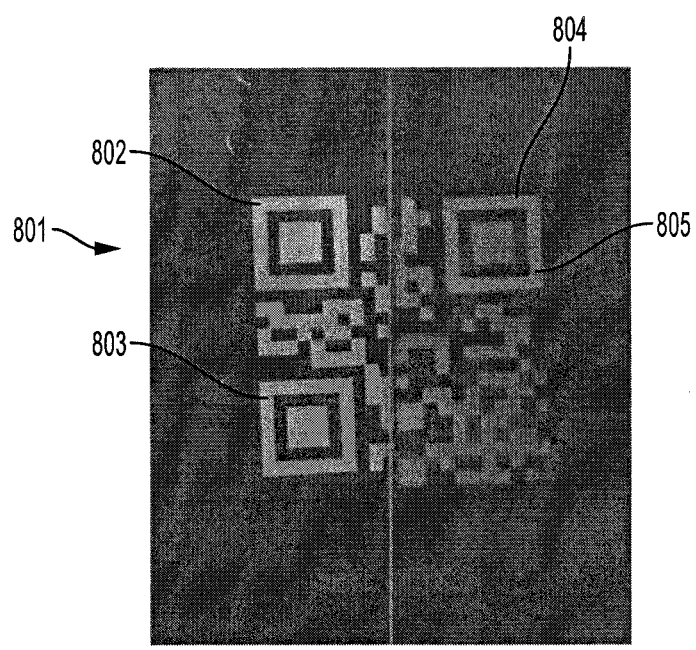
FIG. 8D is a photograph of the first portion of the fluorescent barcode of FIG. 8A positioned adjacent to the second portion of the fluorescent barcode of FIG. 8A to form the fluorescent barcode.

Referring now to FIG. 8D, the barcode reader device can then combine the image of the first portion 803 with the image of the second portion 805, as shown, to form the barcode 801. For example, the first portion 803 may be placed adjacent to the image of the second portion 805. After this combination, the barcode 801 can be scanned as if it were a conventional barcode. In some embodiments, any number of portions of the barcode may be separated and/or superimposed.

Referring to FIG. 8A, in order to read the barcode 801, an unauthorized user must first learn that the first portion 803 must be separated from the second portion 805. The unauthorized user must then figure out how to separate each of the two portions 803, 805 and then determine how to properly combine the portions 803, 805.

Figure 9A:
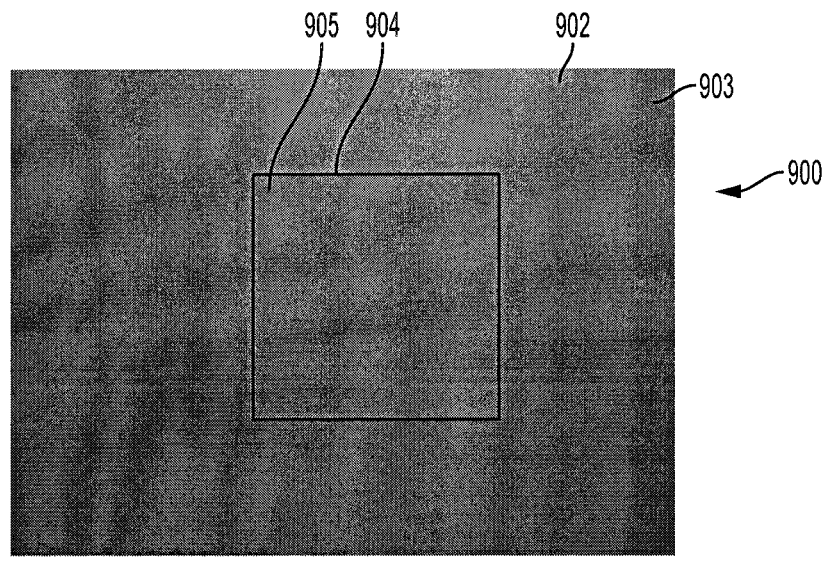
FIG. 9A is a photograph of a secure document having a fluorescent barcode of a first color printed on a substrate having optical brighteners and viewed under ultraviolet and/or infrared light.

Turning now to FIG. 9A, another secure document 900 may include a fluorescent ink 905. The fluorescent ink 905 may appear colorless under normal light and may be visible when illuminated by light having a particular wavelength. For example, the ink 905 may fluoresce red when illuminated by ultraviolet light.

The substrate 902 may be any substrate having optical brighteners 903. Most white printing paper available in the market includes such optical brighteners to increase the "white" appearance of the paper. In that regard, the substrate 902 may include most commercially available white printing paper. All optical brighteners fluoresce when illuminated by ultraviolet light. Thus, because the substrate 902 includes the optical brighteners 903, all portions of the substrate 902 will fluoresce when exposed to ultraviolet light.

A barcode 904 may be printed using the ink 905. However, while the ink 905 may fluoresce when illuminated by ultraviolet light, the optical brighteners 903 will also fluoresce. The fluorescence of the optical brighteners 903 is sufficiently great to mask the ink 905 under ultraviolet lighting.

Figure 9B:
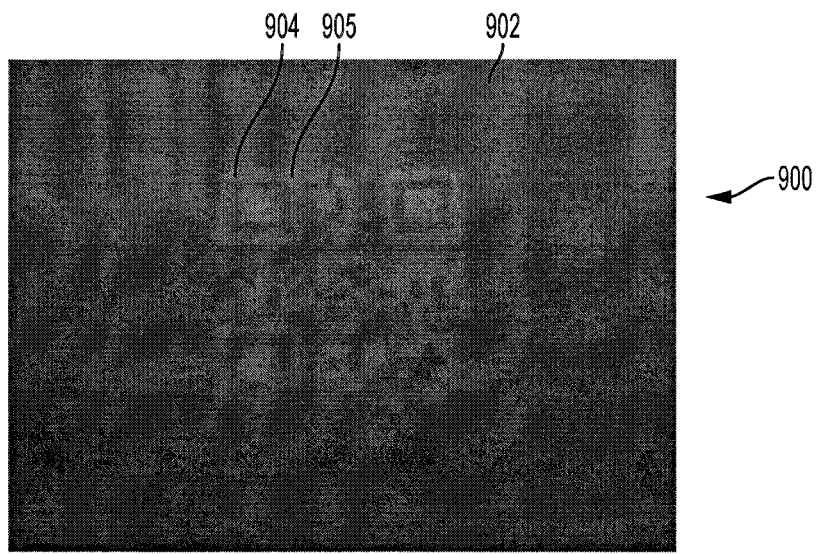
FIG. 9B is a photograph of the secure document of FIG. 9A with all colors except for the first color.

Conventional optical brighteners, such as the optical brighteners 903, do not produce a red color when illuminated by ultraviolet light. Thus, because the ink 905 fluoresces red, the barcode 904 can be viewed by filtering out all non-red colors. The result of this filtering, as shown in FIG. 9B, is that the barcode 904 is visible and, thus, can be scanned by the barcode reader device.

In order to read the barcode 904, an unauthorized user must first learn that the barcode 904 exists. This is particularly difficult because it is not visible under normal lighting or under ultraviolet or infrared lighting. Upon learning that the barcode 904 is present on the secure document 900, the unauthorized user must then learn that all colors but red should be filtered out in order to view the barcode 904.

Figure 10A:
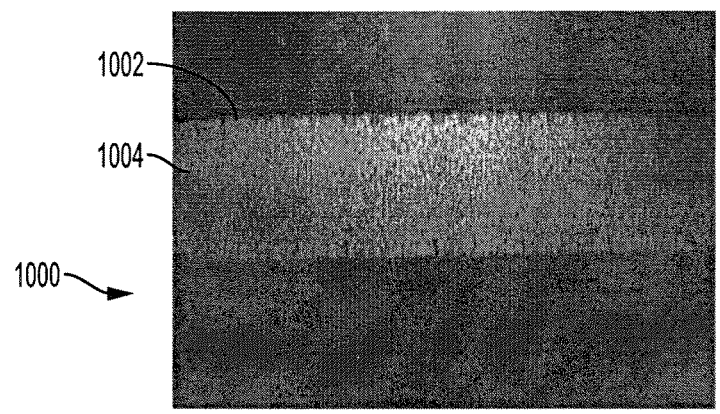
FIG. 10A is a photograph of a secure document having a first fluorescent ink, a second fluorescent ink and a fluorescent barcode separated into two portions that are positioned in separate locations of the secure document as viewed under ultraviolet and/or infrared light.
Figure 10B:
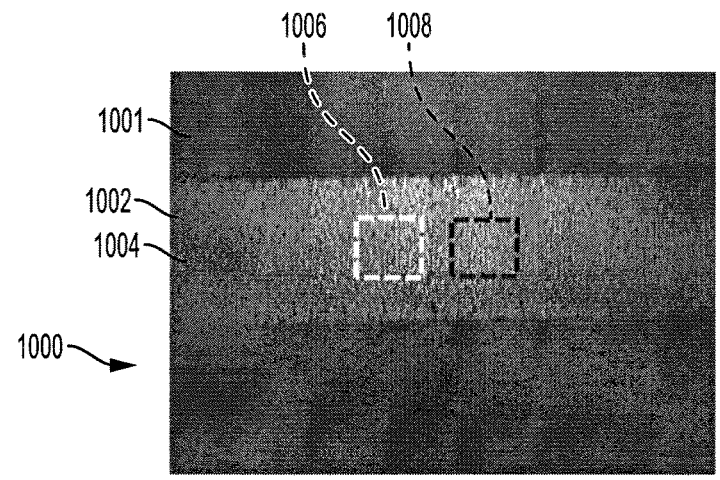
FIG. 10B is a photograph of the secure document of FIG. 10A with the separate locations identified.

Turning to FIG. 10A, another secure document 1000 may include a first fluorescent ink 1002 and a second fluorescent ink 1004. The first ink 1002 and the second ink 1004 may appear colorless under normal lighting and may appear as different colors when illuminated by ultraviolet or infrared light. For example, the first ink 1002 may appear red while the second ink 1004 appears blue.

As shown in FIG. 10A, the secure document 1000 does not appear to contain a discernable barcode. However, referring to FIG. 10B, the secure document 1000 may include a first portion 1006 and a second portion 1008. The first portion 1006 and the second portion 1008 may be positioned within specific areas of a substrate 1001. For example, a barcode may include all of the first ink 1002 that is positioned within the first portion 1006 and all of the first ink 1002 that is positioned within the second portion 1008. As another example, a barcode may include all of the first ink 1002 positioned within the first portion 1006 and all of the second ink 1004 positioned within the second portion 1008.

In order to extract a barcode from the secure document 1000, the first ink 1002 is to be separated from the second ink 1004. Next, the first ink 1002 in the first portion 1006 is to be combined with the first ink 1002 in the second portion 1008, resulting in a readable barcode.

In order to achieve this extraction, a color filter may be applied to the secure document 1000 to filter out the second ink 1004. The color filter may be physical or logical. After filtering out the second ink 1004, a an image of the first ink 1002 may be captured while fluorescing. A processor may then separate the first ink 1002 within the first portion 1006 and the first ink 1002 within the second portion 1008 and combine them, resulting in a scannable barcode 1010, as shown in FIG. 10C.

Many steps are required for an unauthorized user to be able to scan the barcode 1010. First, the unauthorized user must learn that a barcode exists on the secure document 1000. Next, the unauthorized user must learn that two portions of the barcode exist, along with the exact locations of the portions. The unauthorized user must then learn which colors within each portion are to be used, filter the proper colors and then combine the correct colors from each portion.

Figure 10C:
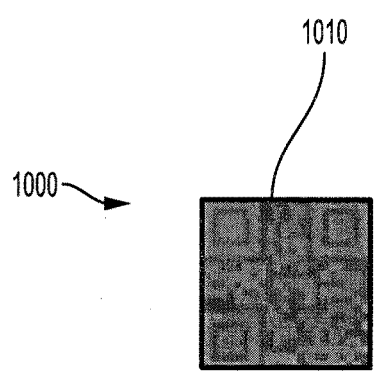
FIG. 10C is a photograph of the combined two portions of the fluorescent barcode of the secure document of FIG. 10A.

Referring to FIGS. 10A and 10C, the secure document 1000 can be further secured by being designed such that an image appears on the secure document 1000 when viewed out of focus. In that regard, the combined first ink 1002 and second ink 1004 are an autostereogram. The image that appears may be any image or may be the barcode 1010. The autostereogram feature may be included with any other security feature, such as with the first ink 604 and second ink 606 of FIG. 6A.

Figure 11A:
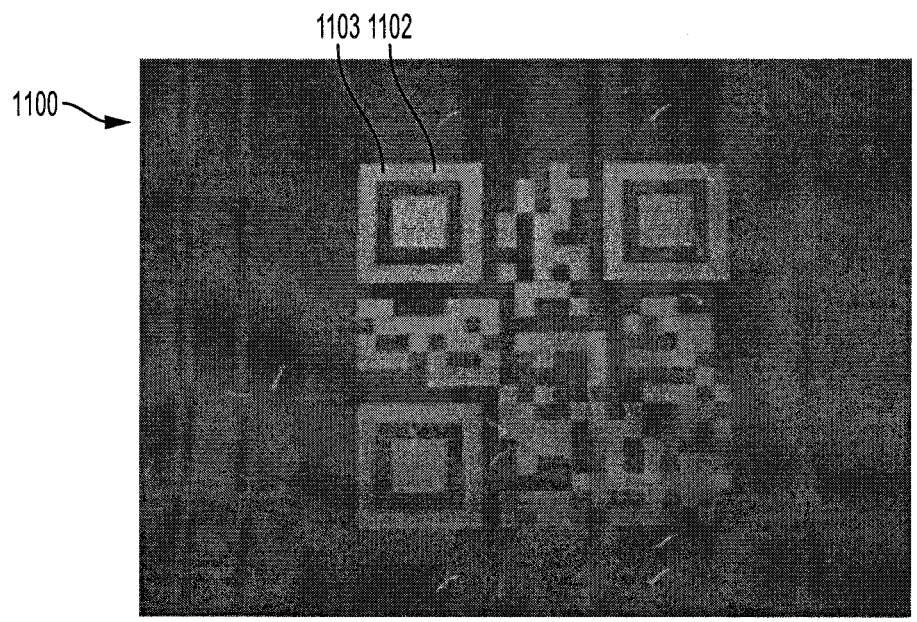
FIG. 11A is a photograph of a secure document having a fluorescent barcode responsive to light of a first wavelength and a fluorescent filler that resembles a second barcode, responsive to light of a second wavelength, as viewed under ultraviolet and/or fluorescent light of the first wavelength.
Figure 11B:
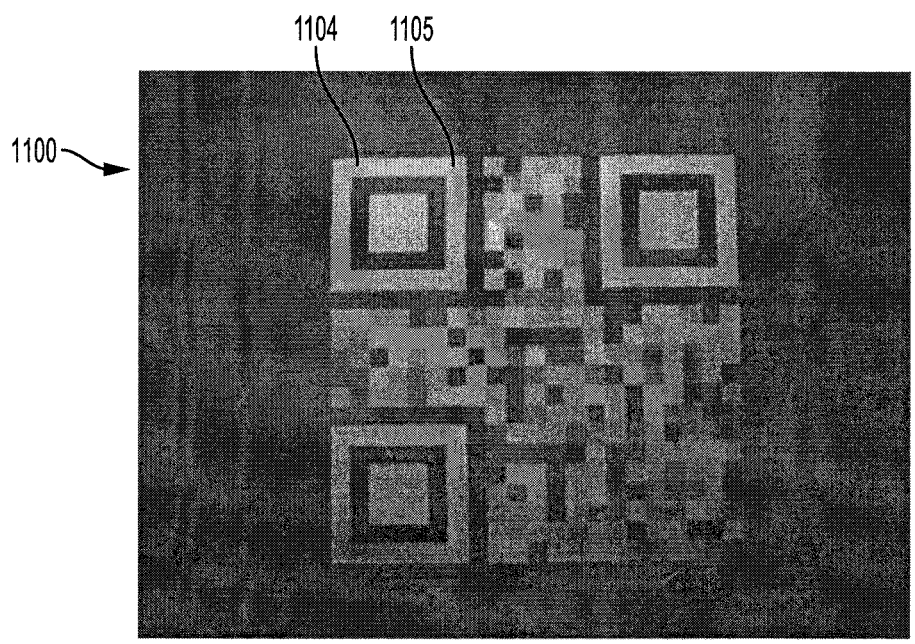
FIG. 11B is a photograph of the secure document of FIG. 11A as viewed under ultraviolet and/or fluorescent light of the second wavelength.

Turning to FIGS. 11A and 11B, a secure document 1100 may include a first florescent ink 1102 and a second fluorescent ink 1104. The first ink 1102 and the second ink 1104 may each be fluorescent and thus fluoresce when subjected to ultraviolet or infrared light and appear colorless under normal lighting. The first ink 1102 may fluoresce when illuminated by a light having a first wavelength and the second ink 1104 may fluoresce when illuminated by a light having a second wavelength that is different from the first wavelength.

A first barcode 1103 is printed using the first ink 1102 and a second barcode 1105 is printed using the second ink 1104. When the secure document 1100 is illuminated by a light having the first wavelength, the first barcode 1103 fluoresces, as shown in FIG. 11A. When the secure document 1100 is illuminated by a light having the second wavelength, the second barcode 1105 fluoresces, as shown in FIG. 11B. Furthermore, when the first barcode 1103 is fluorescing, the second barcode 1105 may not be visible and when the second barcode 1105 is fluorescing, the first barcode 1103 may not be visible.

The first barcode 1103 may be the "real" barcode and the second barcode 1105 may be a "dummy" barcode. Thus, many levels of security are included in the secure document 1100. First, an unauthorized user must learn that fluorescent barcodes are present. The unauthorized user must then learn that more than one barcode is present and learn which wavelengths will elicit a response from the fluorescent inks 1102, 1104. The unauthorized user must then learn which of the barcodes 1103, 1105 is the "real" barcode and which is the "dummy" barcode.

To decrease the likelihood of successful reading of the first barcode 1103 and recreation of the secure document 1100, the second ink 1104 of the second barcode 1105 may be selected to fluoresce when illuminated by ultraviolet light having the most commonly available wavelength.

In various embodiments, secure documents similar to the secure document 1100 may include any number barcodes printed using any number of inks that are visible under light of various wavelengths. As more "dummy" barcodes are added, the difficulty in extracting the "real" barcode becomes more and more difficult. In various embodiments, each of the inks used may fluoresce when illuminated by a different one of ultraviolet A light, ultraviolet B light and ultraviolet C light.

Figure 12A:
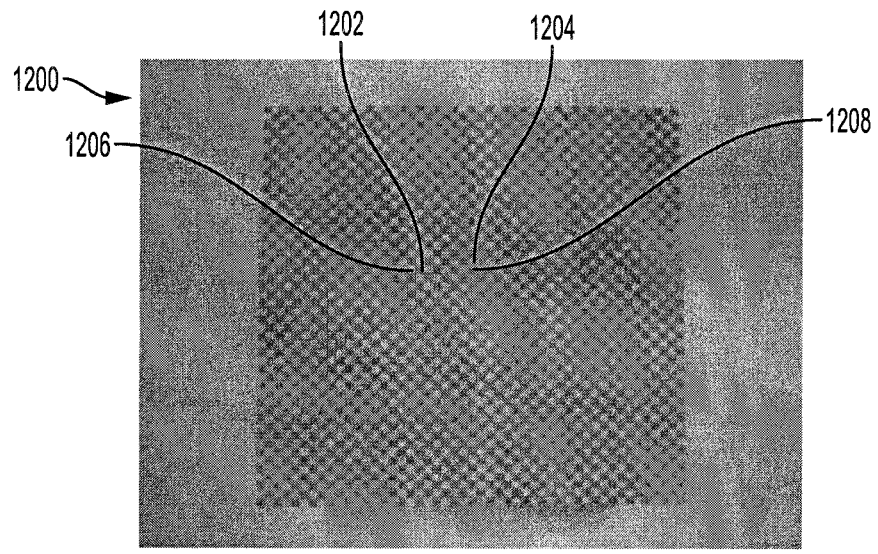
FIG. 12A is a photograph of a secure document having a pattern using two visible inks and a fluorescent barcode having two fluorescent inks of similar colors, viewed under normal lighting.

Turning to FIG. 12A, another secure document 1200 may include visible inks and fluorescent inks. More particularly, the secure document 1200 includes a first visible ink 1202 and a second visible ink 1204. The first visible ink 1202 may have a different color than the second visible ink 1204. The first visible ink 1202 and the second visible ink 1204 may form an image or a pattern. The secure document 1200 is shown in FIG. 12A under normal lighting such that the first visible ink 1202 and the second visible ink 1204 are illuminated.

The secure document 1200 also includes a first fluorescent ink 1206 and a second fluorescent ink 1208. The first fluorescent ink 1206 and the second fluorescent ink 1208 may be colorless under normal lighting and fluoresce under ultraviolet or infrared lighting. The first fluorescent ink 1206 and the second fluorescent ink 1208 may each have a different color. In some embodiments, the color of the first fluorescent ink 1206 is the same as the color of the first visible ink 1202, and the color of the second fluorescent ink 1208 is the same as the color of the second visible ink 1204.

Figure 12B:
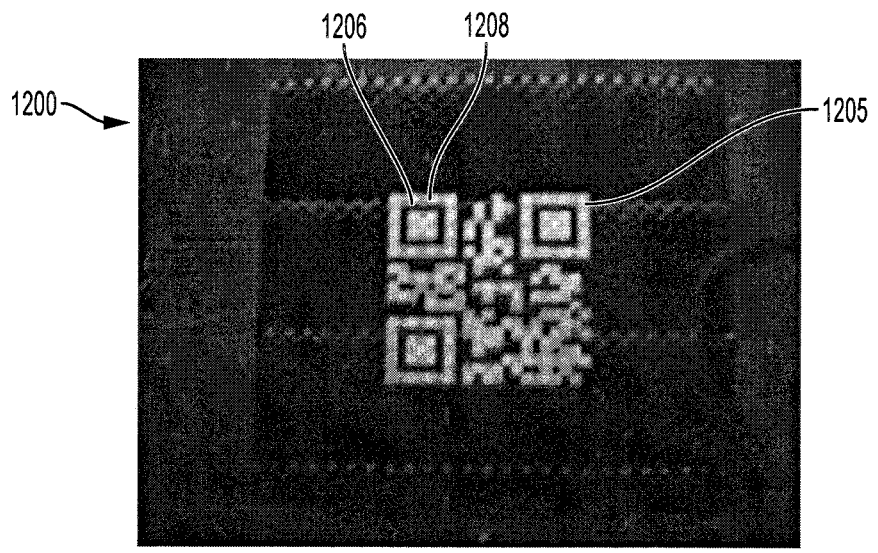
FIG. 12B is a photograph of the secure document of FIG. 12A viewed under ultraviolet and/or fluorescent light.

Referring to FIGS. 12A and 12B, the first fluorescent ink 1206 and the second fluorescent ink 1208 may represent a barcode 1205. The barcode 1205 is visible under ultraviolet light, as shown in FIG. 12B. To increase the security of the barcode 1205, the first fluorescent ink 1206 may be superimposed on the first visible ink 1202 and the second fluorescent ink 1208 may be superimposed on the second ink 1204.

The combination of the visible ink 1202 and the visible ink 1204 forms an interference pattern that increases the difficulty of discovering the fluorescent inks 1206, 1208. For example, an unauthorized user must first realize that the fluorescent inks 1206, 1208 are present under the visible inks 1202, 1204. The unauthorized user must then learn where the fluorescent inks 1206, 1208 are positioned on the secure document 1200.

In various embodiments, a secure document similar to the secure document 1200 may include any number of visible inks and any number of fluorescent inks.

The secure document 1200 may be printed in a variety of manners. Because the secure document 1200 includes four inks, it can be printed using a printer that has two visible inks and two fluorescent inks. In that regard, the secure document 1200 can be printed at a single time with a single pass through the printer. The secure document 1200 can also be printed using two printers. For example, the visible inks can be printed using a first printer and the fluorescent inks can be printed using a second printer.

Figure 13A:
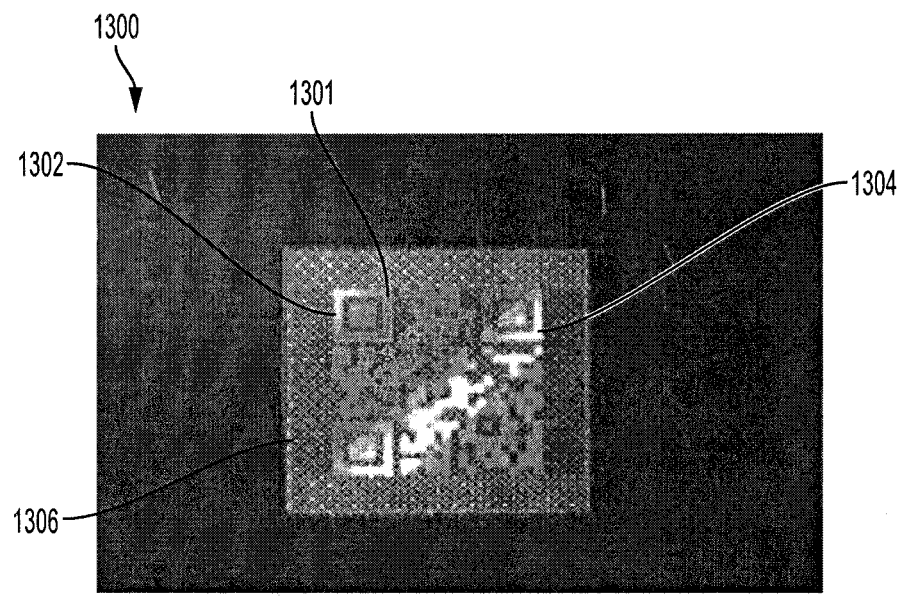
FIG. 13A is a photograph of a secure document having a first feature including a first fluorescent ink of a first color and a second fluorescent ink of a second color that resembles a foil hologram and a fluorescent background pattern including a first fluorescent ink of a third color and a second fluorescent ink of a fourth color that provides a three dimensional effect when viewed using anaglyph glasses.
Figure 13B:
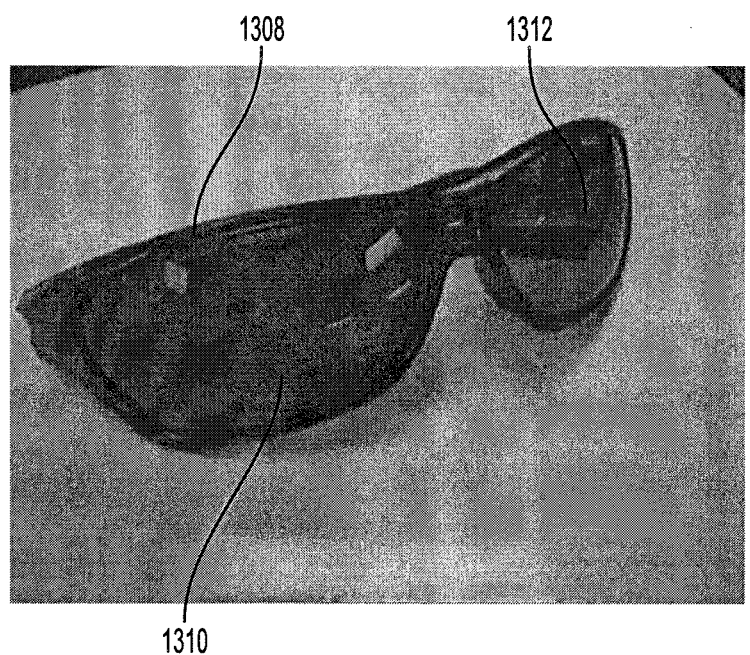
FIG. 13B is a photograph of anaglyph glasses usable to view the three dimensional effect of the background pattern of FIG. 13A.

Turning now to FIG. 13A, a secure document 1300 may include a first ink 1302 and a second ink 1304. The first ink 1302 and the second ink 1304 may appear colorless under normal lighting and may appear as different colors when illuminated by ultraviolet or infrared light. For example, the first ink 1302 may appear red while the second ink 1304 appears blue.

The secure document 1300 may include a first fluorescent feature 1301 that resemble a foil hologram in that different colors fluoresce at different locations along the feature 1301. This type of color change is relatively difficult to recreate, increasing the difficulty in forging the secure document 1300. Thus, not only must a counterfeiter learn that the feature 1301 exists, but must also learn how to print a feature resembling a foil hologram.

The secure document 1300 may also include a fluorescent background pattern 1306. The background pattern 1306 may also be printed using both the first ink 1302 and the second ink 1304. In that regard and referring to FIGS. 13A and 13B, the background pattern 1306 may be designed to resemble a three-dimensional shape when viewed using the anaglyph glasses 1308.

The anaglyph glasses 1308 may include a first lens 1310 and a second lens 1312. The first lens 1310 may filter a different color of light than the second lens 1312. Due to the design of the background pattern 1306 using the two inks 1302, 1304, the three dimensional effect is created. This three dimensional effect is relatively difficult to make, increasing the difficulty of recreation of the background pattern 1306.

The first fluorescent feature 1301 and the background pattern 1306 may each be used as standalone security features or may be used in combination. In that regard, any of the security features described above may be combined to increase the difficulty of reading or counterfeiting secure documents.

Furthermore, the complexity of the various security features can be increased by manipulation and/or addition of colors. For example and referring to FIG. 6A, the color of the first ink 604 may be red and the color of the second ink 606 may be green. A red filter will filter out all of the red, and a green filter will filter out all of the green. However, the secure document 600 may either include a separate yellow ink or the first ink 604 and the second ink 606 may be superimposed to make yellow. Thus, the secure document 600 will include red, green and yellow coloring. Because yellow includes some red, the filter used to remove the green coloring will leave the first ink 604 along with the yellow ink.

Although the present invention is set forth herein in the context of the appended drawing figures, it should be appreciated that the invention is not limited to the specific form shown. For example, while the invention is conveniently described in connection with electrostatic printing, the invention is not so limited; the present invention may be implemented using other forms of printing such as ionographic, magnetographic, electrophotographic, inkjet, thermal, offset, 3D, and similar imaging techniques. Various other modifications, variations, and enhancements in the design and arrangement of the method and device set forth herein, may be made without departing from the spirit and scope of the present invention as set forth in the appended claims.

What is claimed is:

1. A secure document system comprising:
   a substrate;
   a first fluorescent barcode printed within a specific area of the substrate, the first barcode configured to emit a light of a first color when irradiated by an ultraviolet or infrared light; and
   a second fluorescent barcode printed within the specific area of the substrate, the second fluorescent barcode configured to emit a light of a second color, different from the first color, when irradiated by an ultraviolet or infrared light, the first and second barcodes emitting light simultaneously when irradiated by the ultraviolet or infrared light, the simultaneous emitting of the first and second fluorescent barcodes preventing scanning of the first barcode;
   whereby a filter configured for filtering out the second color of the second fluorescent barcode is required to read the first fluorescent barcode.

2. The secure document system of claim 1, wherein the second fluorescent barcode is at least one of positioned within empty space defined by the first fluorescent barcode or superimposed on the first fluorescent barcode.

3. The secure document system of claim 1, wherein the second fluorescent barcode has a pattern that is different from the first fluorescent barcode.

4. The secure document system of claim 3, wherein combined emission of the first fluorescent barcode and the second fluorescent barcode resembles a third barcode, having another pattern different from the first fluorescent barcode and the second fluorescent barcode.

5. A secure document system comprising:
   a substrate;
   a first fluorescent barcode printed within a specific area of the substrate, the barcode fluorescing in a first color when illuminated by light having a first wavelength; and
   a fluorescent filler in the first fluorescent barcode that fluoresces when illuminated by light having a second wavelength, different from the first wavelength, whereby the second wavelength light is more commonly generated than the first wavelength light; and whereby a third wavelength light is required to illuminate the first fluorescent barcode.

6. The secure document of claim 5, wherein the first fluorescent barcode and the fluorescent filler are both positioned in substantially the same area on the substrate.

* * * * *